| (12) | United States Patent | (10) Patent No.: | US 9,047,727 B2 |
|---|---|---|---|
| | Goyet | (45) Date of Patent: | Jun. 2, 2015 |

(54) PORTABLE ELECTRONIC DEVICE AND METHOD FOR SECURING SUCH DEVICE

(75) Inventor: Christophe Goyet, Lyons (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 1159 days.

(21) Appl. No.: 12/521,231

(22) PCT Filed: Dec. 21, 2007

(86) PCT No.: PCT/FR2007/002157
§ 371 (c)(1),
(2), (4) Date: Jun. 25, 2009

(87) PCT Pub. No.: WO2008/096078
PCT Pub. Date: Aug. 14, 2008

(65) Prior Publication Data
US 2010/0017881 A1    Jan. 21, 2010

(30) Foreign Application Priority Data

Dec. 26, 2006 (FR) ...................................... 06 55960

(51) Int. Cl.
*G06F 11/00* (2006.01)
*G07F 7/10* (2006.01)
*G06F 21/34* (2013.01)
*G06F 21/35* (2013.01)
(Continued)

(52) U.S. Cl.
CPC ............... *G07F 7/1008* (2013.01); *G06F 21/34* (2013.01); *G06F 21/35* (2013.01); *G06F 21/55* (2013.01); *G06F 2221/2135* (2013.01); *G06Q 20/341* (2013.01); *G06Q 20/352* (2013.01); *G06Q 20/35765* (2013.01); *G07C 9/00007* (2013.01); *G07C 9/00087* (2013.01); *G07F 7/084* (2013.01); *G07F 7/1083* (2013.01)

(58) Field of Classification Search
CPC ............ H04L 63/1408; H04L 63/1416; H04L 63/1441; H04L 63/1458; H06F 21/552
USPC ........ 726/2, 4, 23–25; 713/170; 380/229, 232
See application file for complete search history.

(56) References Cited

U.S. PATENT DOCUMENTS 5,051,564 A * 9/1991 Schmidt ......................... 235/381
5,296,816 A * 3/1994 Birkinshaw ................... 324/457
(Continued)

FOREIGN PATENT DOCUMENTS

| EP | 1467312 | 10/2004 |
|---|---|---|
| FR | 2786006 | 5/2000 |

OTHER PUBLICATIONS

International Search Report dated Aug. 25, 2008, in PCT application.

*Primary Examiner* — Saleh Najjar
*Assistant Examiner* — Peiliang Pan
(74) *Attorney, Agent, or Firm* — Young & Thompson (57) ABSTRACT

A portable electronic device includes a first interface adapted for establishing a communication with a first external electronic entity. A first security element is adapted for detecting at least one type of attack and forbidding at least one data communication using the first interface after the detection of an attack. A second interface is different from the first interface and is adapted for establishing a communication with a second external electronic entity. A management element of the first security element uses the second interface for managing the first security element.

22 Claims, 2 Drawing Sheets

(51) Int. Cl.
  *G06F 21/55* (2013.01)
  *G06Q 20/34* (2012.01)
  *G07C 9/00* (2006.01)
  *G07F 7/08* (2006.01)

(56) References Cited

U.S. PATENT DOCUMENTS

| | | |
|---|---|---|
| 6,363,335 B1 * | 3/2002 | Monroe et al. .................. 703/21 |
| 6,411,200 B1 * | 6/2002 | Kawagishi ................. 340/10.51 |
| 6,726,108 B1 * | 4/2004 | Guion ........................... 235/492 |
| 7,277,404 B2 * | 10/2007 | Tanzella et al. ............... 370/310 |
| 7,409,552 B2 * | 8/2008 | Buttyan et al. ................ 713/172 |
| 8,184,810 B2 * | 5/2012 | Furuyama ..................... 380/239 |
| 2002/0016913 A1 * | 2/2002 | Wheeler et al. ............... 713/170 |
| 2002/0149502 A1 * | 10/2002 | Goss ........................ 340/870.07 |
| 2003/0023775 A1 * | 1/2003 | Blackmore et al. ........... 709/330 |
| 2005/0216955 A1 | 9/2005 | Wilkins |
| 2006/0113381 A1 | 6/2006 | Hochstein |
| 2006/0246611 A1 * | 11/2006 | Cheong et al. .................. 438/14 |
| 2006/0283960 A1 | 12/2006 | Top |
| 2007/0094741 A1 * | 4/2007 | Lynn et al. ...................... 726/26 |
| 2007/0101128 A1 * | 5/2007 | Kamoi .......................... 713/159 |
| 2007/0110053 A1 * | 5/2007 | Soni et al. ..................... 370/389 |
| 2007/0129112 A1 * | 6/2007 | Tarn .............................. 455/566 |

* cited by examiner

PORTABLE ELECTRONIC DEVICE AND METHOD FOR SECURING SUCH DEVICE

BACKGROUND OF THE INVENTION

1. Field of the Invention

The present invention concerns a portable electronic device and a method for securing such a device. It is applied, in particular, to microelectronic entities having two interfaces. It concerns the management of the security of portable electronic entities having a plurality of interfaces and, more particularly, to management of the authentication of such an entity.

2. Description of the Related Art

The use of error counters in a secured microcircuit is well known. These error counters are used, for example, in smart cards to monitor the use of a personal identification number (PIN). For example, if an incorrect PIN is received by the card, an error counter is incremented by one. If the next PIN is correct, the error counter is reset to zero. If not, the counter is incremented again. In this way, the error counter retains a count of the number of incorrect PINs received in succession. If the value of this counter reaches a certain limit, subsequent use of the pin, and of the card, is blocked.

Cards are generally supplied with a mechanism that authorizes access, by way of different secret codes, to unblock a blocked card. These secret codes are normally held by the provider of the card, for example a bank. Thus the card holder is obliged to turn to the supplier of the card or a similar authority to unblock their card.

There is known the document FR 2 786 006, which describes an anti-fraud device for an integrated circuit card including a data memory and a counter. The counter counts, on the one hand, a number of occurrences of events that have occurred in the device and is, on the other hand, liable to reach a threshold value. An indicator element goes from a first state to a second state when the counter has reached the threshold value and blocks the operation of the card.

The drawback of these procedures is particularly clear in the case of cards with two interfaces, one requiring contact and the other contactless. A hacker could use the contactless interface to block the card without the cardholder being made aware of this, for example, by sending a series of authentication requests with incorrect authentication codes. Such an attack effected on a large scale could cause considerable damage to the cardholders and to the card provider obliged to intervene to unblock the cards blocked in this way.

SUMMARY OF THE INVENTION

The present invention aims, notably, to remedy these drawbacks and to counter such an attack.

To this end, a first aspect of the present invention is directed to a portable electronic device that includes:
- a first interface adapted to establish communication with a first external electronic entity,
- first security means adapted to detect at least one type of attack and to prohibit at least one communication of data using said first interface after detection of one of said attacks,
- a second interface different from the first interface adapted to establish communication with a second external electronic entity, and
- means for administration of the first security means using the second interface to administer the first security means.

According to particular features, the first security means use a secret code, the administration means being adapted to modify said secret code.

According to particular features, the first security means use a cryptographic key, the administration means being adapted to modify said cryptographic key.

According to particular features, the first security means use biometric data, the administration means being adapted to modify said biometric data.

According to particular features, the administration means are adapted to re-authorize communication of data using said first interface after prohibition, by the first security means, of said communication on detection of one of said attacks.

According to particular features, the first interface is provided with first means for receiving data from a first external electronic entity, a first data memory area containing at least one first counter element, at least one first indicator element and at least one first threshold value, said first counter element counting, on the one hand, at least one number of occurrences of a predetermined event that has occurred in said device on reception of data by said first receiving means, and, being, on the other hand, able to reach said first threshold value, said first indicator element going from a first state to a second state if said first counter element has reached said first threshold value.

According to particular features, the second interface is provided with second means for receiving data from a second external electronic entity, a second data memory area containing at least one second counter element, at least one second indicator element and at least one second threshold value, said second counter element counting, on the one hand, at least one number of occurrences of a second predetermined event that has occurred in said device on reception of data by said second receiving means, and, being, on the other hand, able to reach said second threshold value, said second indicator element going from a first state to a second state if said second counter element has reached said second threshold value.

According to particular features, the first memory area and the second memory area are different.

It is seen that the first and second external electronic entities can be the same electronic entity, for example a card reader or a personal computer.

Thanks to each of these features, the different interfaces are secured differently, for example for an attempt at access. For example, an attempt at authentication is secured differently, according to whether it is triggered by way of the first interface or the second interface, so as to adapt to the characteristics of each interface, for example the range, in the case of a contactless interface, and the frequency of communication via the interface.

According to particular features, the device as succinctly described hereinabove includes means for blocking at least one part of the operation of said device when an indicator element is in the second state.

According to particular features, the device as succinctly described hereinabove includes blocking means that block all execution on reception of data via the corresponding interface when the corresponding indicator element is in the second state.

According to particular features, the device as succinctly described hereinabove includes blocking means that block all execution on reception of data via the corresponding interface when the corresponding indicator element is in the second state except the reception of an unblocking instruction.

Thanks to each of these features, only the interface at which an attack has been detected is blocked. The other interface remains usable and, for example, can be used to unblock the blocked interface.

According to particular features, the device as succinctly described hereinabove includes means for switching adapted to use more secure security means of the device when an indicator element is in the second state than when the indicator element is in the first state.

According to particular features, one of said events corresponds to the use of processing involving a secret value stored in a memory area of the electronic device.

Accordingly, by monitoring the number of occurrences of use of a secret value, for example a personal identification number, some attacks intended to discover all or part of that secret value can be prevented.

According to particular features, one of said events is a failed attempt at authentication by the electronic device.

Thanks to these features, it is possible to resist attacks consisting in effecting, successively, a large number of attempts at authentication, as explained hereinabove.

According to particular features, one of said events is the use of a cryptographic key. Thus the signature, encryption and/or decryption operations carried out by the device are counted, for example to implement a "challenge/response" type protocol, consisting in the device sending a random number, encryption of the random number using a key stored by the external entity that wishes to be authenticated, and sending the device the result of the encryption for the device to verify that it obtains the same result calculated for itself using the same key. These operations are effected on reception of a command or a message via an interface.

According to particular features, the device as succinctly described hereinabove includes means for commanding at least one indicator element to go from the second state to the first state in the event of a successful attempt at authentication using an interface that does not correspond to said indicator element.

Thus one interface can be unlocked using another interface. Accordingly, on reception of correct authentication data by the receiving means of an interface, the indicator element corresponding to another interface is made to go from a blocking state to an unblocking state. For example, in the case of the attack cited hereinabove, in which a hacker effects multiple attempts at contactless connection with the device and the device blocks the contactless interface, that contactless interface can be unblocked by a correct authentication using a contact interface without involving the provider of the device. For example, if the device uses badges for entry to a site, this prevents blocking entry of a holder of the device whose contactless interface is blocked, by giving them access to a contact card reader with a keypad enabling that person to enter a personal identification number on the keypad.

According to particular features, the device as succinctly described hereinabove includes means for initialization of the corresponding counter, said initialization means reinitializing said corresponding counter if authentication using the corresponding interface succeeds.

According to particular features, said first and second interfaces use different communication protocols.

Thus the invention applies to cards having a contact interface and a contactless interface.

According to particular features, said first interface includes means for receiving data using a contactless communication protocol.

According to particular features, said first interface includes means for receiving data using a contactless communication protocol conforming to the ISO 14443 standard.

According to particular features, said second interface includes means for receiving data using a contact communication protocol.

According to particular features, said second interface includes means for receiving data using a protocol conforming to the ISO 7816 standard.

According to particular features, said device is a smart card or a USB (Universal Serial Bus) key.

According to particular features, said device as succinctly described above conforms to the FIPS (Federal Information Processing Standards) or a common criterion.

A second aspect of the present invention is directed to a method for securing a portable electronic device that includes:
- a step of communicating with a first external electronic entity via a first interface,
- a step of detection of at least one type of attack using the first interface and of prohibition of at least one communication of data using said first interface after detection of one of said attacks,
- a step of communication with a second external electronic entity via a second interface different from the first interface, and
- a step of administration of the operation of the detection and prohibition step.

The advantages, aims and particular features of this method, being similar to those of the device of the present invention, as succinctly described hereinabove, are not stated here.

BRIEF DESCRIPTION OF THE DRAWING FIGURES

Other advantages, aims and particular features of the present invention will emerge from the following description given by way of nonlimiting explanation with reference to the appended drawings, in which.

Note that the figures are not to scale.

DETAILED DESCRIPTION OF THE INVENTION

Figure 1:
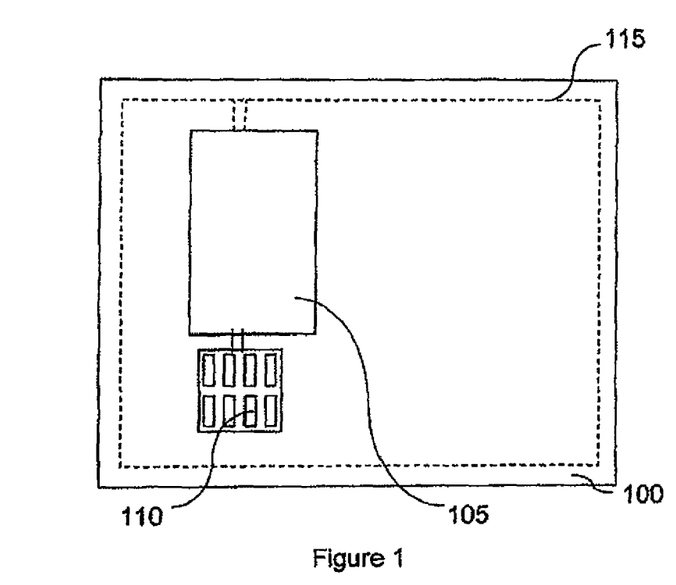
FIG. 1 represents, diagrammatically, a first embodiment of the device of the present invention.

There is seen, in FIG. 1, a portable electronic device, or entity, 100 including a microcircuit 105 connected, on the one hand, to an antenna 115 and, on the other hand, to contacts 110.

The device 100 can be powered via the contacts 110, by an alternating magnetic field received by the antenna 115 or by an internal energy source (not shown), for example a cell, possibly a solar cell.

In various embodiments the electronic device 100 is a microcircuit card, a USB (Universal Serial Bus) key, a communicating mobile terminal, a digital personal assistant or a passport. Some embodiments of the device 100 conform to the FIPS (Federal Information Processing Standards) or to a common criterion.

In the case where the device 100 is a microcircuit card, the contacts 110 are, for example, contacts flush with the surface of the card 100 and conforming to the ISO 7816 standard. On the other hand, in the case where the device 100 is a USB key, the contacts 110 are, for example, those of a USB plug.

Figure 2:
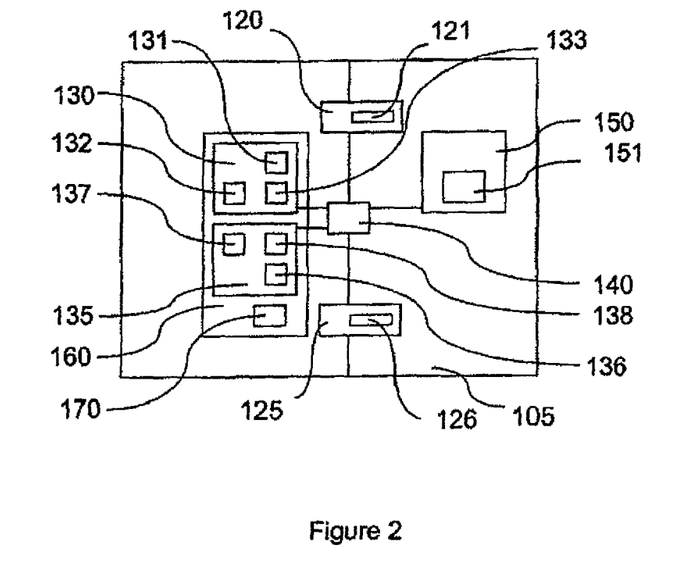
FIG. 2 represents, diagrammatically, elements incorporated in a component shown in FIG. 1.

It is seen, in FIG. 2, that the microcircuit 105 includes a central processing unit (CPU) 140 connected to:
- a non-volatile memory 150,
- a contactless first interface 120 associated with the antenna 115 and including first means 121 for receiving, and where applicable transmitting, data,
- a contact second interface 125 associated with the contacts 110 and including second means 126 for receiving, and where applicable transmitting, data, and
- a memory 160 that includes a first memory area 130 relating to the first interface 120, a second memory area 135, different from the first memory area 130, relating to the second interface 125, and a memory area 170 for secret codes, biometric data, for example representing fingerprints, or cryptographic keys.

As explained hereinafter, in combination with the counter 131, indicator 132, threshold value 133 and operating system 151, the central processing unit 140 constitutes first security means for securing the first interface 120, for example by execution of the steps 315 to 340 shown in FIG. 3.

As explained hereinafter, in combination with the counter 136, indicator 137, threshold value 138 and operating system 151, the central processing unit 140 constitutes second security means for securing the second interface 125, for example by execution of the steps 345 to 370 shown in FIG. 3.

Figure 3:
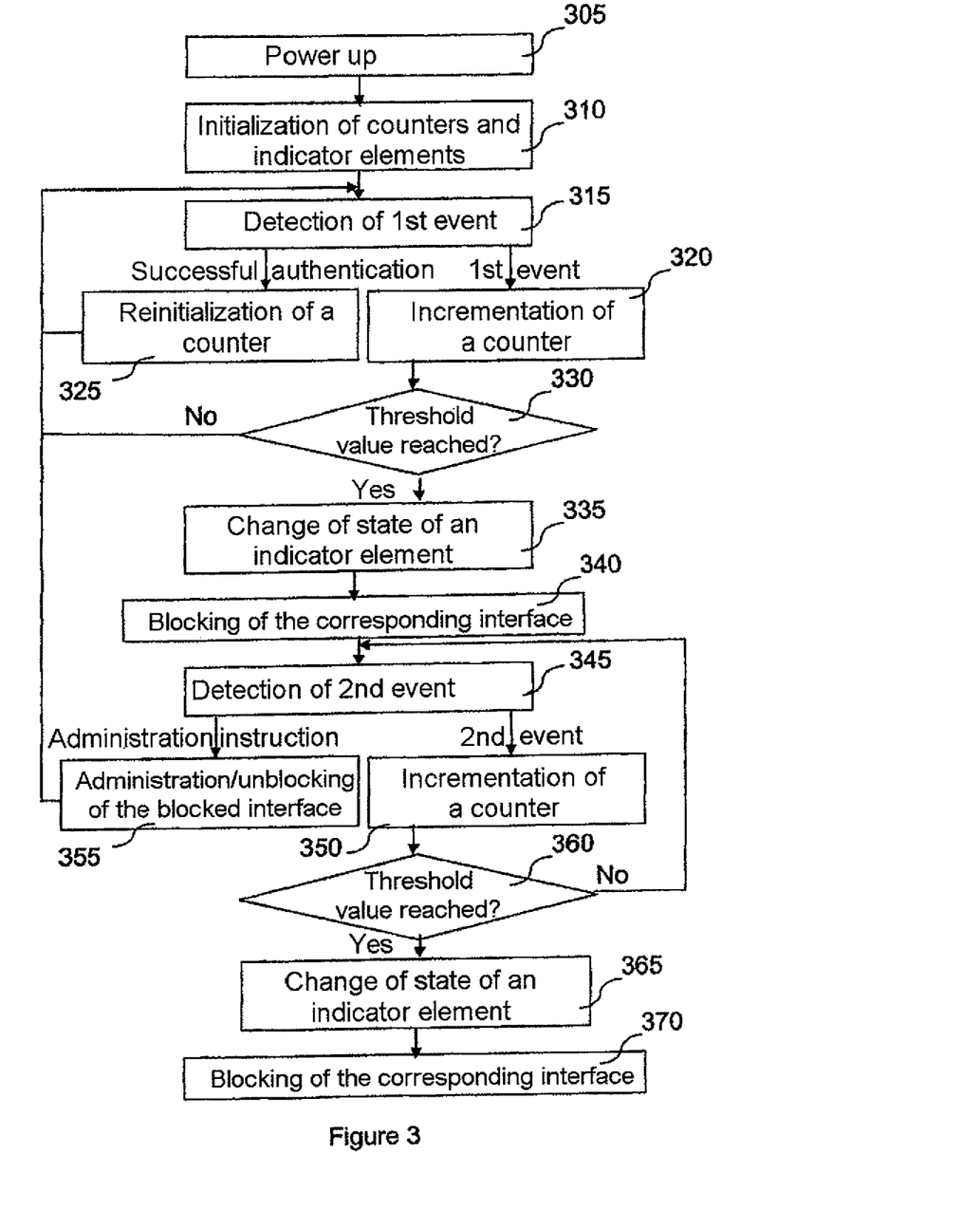
FIG. 3 represents, in flowchart form, steps executed in one particular embodiment of the method of the present invention.

In combination with the operating system 151, the central processing unit 140 constitutes means for managing the first security means using the second interface to manage the first security means of the first interface 120, for example by the execution of the steps 345 and 355 shown in FIG. 3.

The non-volatile memory 150, for example a read-only memory (ROM), holds the operating system 151 of the device 100.

The memory 160 is a volatile memory, for example an electrically erasable programmable read only memory (EEPROM) or a flash memory.

The first memory area 130 includes at least one first counter element 131, at least one first indicator element 132 and at least one first threshold value 133. The first counter element 131 counts at least a number of occurrences of a first predetermined event that has occurred in the device 100 on reception of data by the first receiving means 121. The value of the first counter element 131 can reach the first threshold value 133. The first indicator element 132, for example a binary unit or bit, goes from a first state to a second state if said first counter element 131 reaches the first threshold value 133. For example, the first threshold value 133 is equal to 5.

In the embodiment of the device of the present invention shown in FIGS. 1 and 2, the first interface 120 includes means 121 for receiving data, or messages, under a contactless communication protocol, for example using a contactless communication protocol designed for communication at distances up to 50 centimeters, for example conforming to the ISO 14443 standard or the NFC (Near Field Communication) standard, or a ZigBee (registered trade mark) interface able to communicate at greater distances, of a few meters.

The second memory area 135 includes at least one second counter element 136, at least one second indicator element 137 and at least one second threshold value 133. The second counter element 136 counts at least one number of occurrences of a second predetermined event that has occurred in the device 100 on reception of data by the second receiving means 126. The value of the second counter element 136 can reach the first threshold value 138. The second indicator element 137, for example a binary unit or bit, goes from a first state to a second state if said first second counter 136 reaches the second threshold value 138. The second threshold value 138 is equal to 3, for example.

In the embodiment of the device of the present invention shown in FIGS. 1 and 2, the second interface 125 includes means 126 for receiving data using a contact communication protocol, for example one conforming to the ISO 7816 standard.

In the embodiment of the device of the present invention shown in FIGS. 1 and 2, the first and second interfaces use different communication protocols. Thus the invention applies particularly to cards having a contact interface and a contactless interface. The external electronic entity is, for example, a contact and contactless smart card reader, in the case where the device 100 is a smart card, or a personal computer, in the case where the device 100 is a USB key.

In variants that are not shown, the second interface includes means for receiving data using a ZigBee or USB protocol.

In particular embodiments, the first and second interfaces are identical and separate. In this case, they are used by different applications, the fact of having a different counter for each interface enhancing the security of the device.

The operation of the device 100 is preferably affected by the state of each of the indicator elements 132 and 137.

Accordingly, for example, the different interfaces are secured differently, for events using one of the interfaces, for example an attempt at access, for example to the memory or to one of the areas of the memory or to certain commands. For example, the same event is secured differently, according to whether it is triggered by way of the first interface or the second interface, so as to adapt to the characteristics of each interface, for example the range, in the case of a contactless interface, and/or the frequency of communication via the interface.

In some embodiments, at least one of the predetermined events corresponds to the execution of processing involving a secret value stored in a memory area of the electronic device. Accordingly, by monitoring the number of occurrences of use of a secret value, for example a personal identification number, some attacks intended to discover all or part of that secret value are prevented.

In some embodiments, at least one of the predetermined events is a failed attempt at authentication by the electronic device 100, which also prevents attacks consisting in repeating the attempt at authentication.

In some embodiments, at least one of the predetermined events is presentation of a PIN.

In some embodiments, at least one of the predetermined events is the use of a cryptographic key. Thus the operations of signing, encryption and/or decryption effected by the device to use a "challenge/response" type protocol are counted.

In some embodiments, the operating system 151 of the device 100 includes means for blocking at least part of the operation of the device 100 if an indicator element is in the second state. For example, the device 100 includes blocking means (not shown) that block all execution on reception of data over the corresponding interface if the corresponding indicator element is in the second state. For example, the device 100 includes blocking means (not shown) that block all execution on reception of data over the corresponding interface if the corresponding indicator element is in the second state except for the reception of an unblocking instruction. Thus only the interface at which an attack has been detected is blocked. The other interface remains usable and, for example, can be used to unblock the blocked interface.

In particular embodiments, the device 100 includes switching means (not shown) adapted to use more secure security means of the device if an indicator element is in the second state than if the indicator element is in the first state.

In particular embodiments, the operating system 151 of the device 100 includes means (not shown) for commanding at least one indicator element to go from the second state to the first state in the event of a successful attempt at authentication using an interface not corresponding to said indicator element. Thus one interface can be unblocked using another interface. Accordingly, on reception of correct authentication data by the receiving means of an interface, the indicator element corresponding to another interface is made to go from a blocking state to an unblocking state. For example, in the case of the attack cited hereinabove, in which a hacker makes multiple attempts at contactless authentication by the device and the device blocks the contactless interface, that contactless interface can be unblocked by correct authentication using a contact interface without involving the provider of the device. For example, if the device uses badges for entering a site, this prevents blocking the entry of a device holder using the blocked contactless interface, by providing them with access to a contact card reader with a keypad enabling the person to enter a personal identification number on the keypad. This advantage is decisive in the case of a large-scale attack targeting a large number of access cards.

In particular embodiments, the operating system 151 includes means (not shown) for initializing the counter of at least one memory area, the initialization means reinitializing this counter if authentication using the corresponding interface is successful.

In particular embodiments, at least one memory area includes means (not shown) for initializing the corresponding counter, the initialization means reinitializing the corresponding counter if the corresponding interface is unblocked.

The steps shown in FIG. 3 are more particularly suited to the embodiment of the device of the present invention shown in FIGS. 1 and 2, in the case where the contactless first interface is used for mutual authentication of the device 100 and a reader and where the contact second interface is connected to an external electronic entity of contact card reader type including a keypad for entering a PIN or a fingerprint sensor and means for sending information representing that PIN or that fingerprint to the device 100 via the second interface. The present invention is also particularly suited to the situation where the device 100 includes a fingerprint sensor and means for sending information representing the sensed fingerprint to an external reader via the second interface.

There is seen, in FIG. 3, a step 305 of powering up the device of the present invention. Then, during a step 310, the values of the counters and the indicator elements are initialized.

During a step 315, it is detected if a first predetermined event occurs on reception of data via the first interface of the portable device. In the remainder of the description, the first event is considered to be a failed attempt at mutual authentication of a reader and the electronic device using the contactless first interface. In other embodiments, the first event can be an attempt at authentication using biometric data, for example data representing a fingerprint.

During the step 315, it is also detected if an attempt at authentication has succeeded.

If the first predetermined event occurs, during a step 320, the counter held in the memory area associated with the contactless interface over which data causing the predetermined event to occur has been received is incremented.

If an attempt at authentication has succeeded, during a step 325, the counter held in the memory area associated with the contactless interface, via which data causing the predetermined event to occur has been received, is reinitialized and the process returns to the step 315.

After the step 320, during a step 330, the value of the counter incremented during the step 320 is compared with a threshold value corresponding to the first interface and to the memory area in question.

If the value of the counter does not reach the threshold value, the process returns to the step 315. If, on the other hand, the value of the counter reaches the threshold value, during a step 335, the indicator element corresponding to the contactless interface is made to go from a first state, for example representing the value "0", to a second state, for example representing the value "1".

In the embodiment shown in FIG. 3, when the indicator element associated with the contactless interface is in the second state, during a step 340, the security level of the interface concerned is increased, for example by switching to use more secure security means of the device than when the indicator element is in the first state, in which the use of this contactless interface is blocked. In both cases, the remainder of the description of FIG. 3 refers to a "blocked" interface.

During a step 345, it is detected if a second predetermined event, for example an attempt at authentication using a PIN, occurs on reception of data via the unblocked contact interface. During the step 345, it is also detected if a security administration instruction for the contactless first interface has been received. For example, this administration instruction concerns modification of a secret code, for example a PIN, biometric data or a cryptographic key, or an instruction to unblock the blocked contactless interface.

If the second predetermined event occurs, during a step 350, the counter held in the memory area associated with the unblocked interface is incremented.

If an instruction to unblock the blocked interface has been received, during a step 355, the contactless interface is unblocked and the counter held in the memory area associated with the unblocked interface is reinitialized and the process returns to the step 315. It is seen that, in other embodiments, successful authentication constitutes an unlocking instruction.

If an instruction for modification of a secret code, for example a PIN, biometric data or a cryptographic key has been received, during the step 355, the data concerned is modified in the memory of the device and the contactless interface is unblocked.

After the step 350, during a step 360, the value of the counter incremented during the step 350 is compared with a threshold value corresponding to the contact interface and to the memory area in question.

If the value of the counter does not reach the threshold value, the process returns to the step 345. If, on the other hand, the value of the counter reaches the threshold value, during a step 365, the indicator element corresponding to the contact interface is made to go from a first state, for example representing the value "0", to a second state, for example representing the value "1".

As described above, in the embodiment shown in FIG. 3, when the indicator element associated with the unblocked contact interface is in the second state, during a step 370, the security level of the contact interface is increased, for example by switching to use more secure security means of the device than if the indicator element is in the first state, or the use of this contact interface is blocked.

In the description of FIG. 3, the first event was a failed attempt at authentication by the reader of the electronic device. More generally, at least one of the first and second predetermined events includes the use of processing involving a secret value, for example the use of an encryption, decryption or signature cryptographic key, stored in a memory area, for example the memory 170, of the electronic device. In some cases there is no reinitialization of the counter of uses of processing involving a secret value, during the step 325.

Accordingly, in accordance with the method of the present invention shown in FIG. 3, there are effected:
- a step of communication with a first external electronic entity via a first interface,
- a step of detection of at least one type of attack using the first interface and of prohibition of at least one communication of data using said first interface after detection of one of said attacks,
- a step of communication with a second external electronic entity via a second interface different from the first interface, and
- a step 355 of administration of the operation of the detection and prohibition step.

As is clear after reading the foregoing description, one advantage of the present invention is that it enables the holder of a device of the present invention taking the form of a card, who has been the victim of a DOS (Denial of Service) type attack, without knowing it, via the contactless interface, on the one hand, to prevent the attack from succeeding, since the contactless interface is quickly blocked, and, on the other hand, to restore the operation of the contactless interface without having to involve the provider of the card or any other external party.

For example, in the case of a PACS (Physical Access Control System) card, an attack could seek to prevent employees from entering premises, or to force them, in large numbers, to call those responsible for the security system for the latter, considered to be faulty, to be stopped and access to the premises become free or weakly controlled. In this case, thanks to using the present invention, each employee holding an access card can restore the operation of the contactless interface using an identity employing the contact interface, for example a card reader available near the access door concerned.

Note that a reader operating at a distance can communicate with the electronic entity although the latter is also connected to a contact terminal. This is the case, for example, of a smart card inserted in an appropriate terminal of a vehicle when the latter passes under a portal provided with a remote reader. The exchange of data between the electronic entity and the remote reader (for example to open a barrier and/or to pay a toll) can thus be independent of the particular conditions managed by the contact terminal placed in the vehicle, for example entry of a secret code on the terminal by the user or operation of a control switch on the steering wheel.

In the embodiment that has just been described, the indicator element associated with each interface conditions all exchanges of data using that interface. Alternatively, this indicator element conditions only the exchange of certain particular data of the electronic entity, while other data is freely communicated by the electronic entity, even if the interface in question is blocked.

Accordingly, if the electronic entity is an electronic identification document, some data present on the document (like the name of the person concerned) can be communicated even in the event of blocking, whereas the sending of other data (for example confidential information of the biometric data type—fingerprints, iris or facial image) can be sent by the electronic entity via an interface only on condition that the interface is not blocked.

In this case, the presence of interface blocking will not condition the setting up of the contactless link proper, but some steps of sending confidential data.

In a different embodiment (which could be combined with the embodiments that have just been described), the value of the indicator element can condition the reception of data via the interface with which that indicator element is associated. For example it is possible to prevent an identification code from being presented to the electronic entity via the contactless link by a malicious third party, unknown to the authorized holder of the electronic entity, by blocking the reception of data via that interface following the presentation of a number of incorrect codes by that third party.

Moreover, the data to which the exchange authorization relates is not necessarily limited to application data of the electronic entity (i.e. notably the data carried by the electronic entity in its information medium function), but can also include data of other types, such as data for setting up a communication protocol.

The embodiments that have just been described, and the alternative embodiments that have been envisaged, constitute only possible embodiments of the invention, which is not limited to them.

The invention claimed is:

1. A portable electronic device, comprising:
   - a first interface comprising means for emitting data and means for receiving data, said first interface being adapted to establish communication with a first external electronic entity,
   - first means for security adapted to detect at least one type of attack and to prohibit at least one communication of data using said first interface after detection of one of said attacks,
   - a second interface comprising means for emitting data and means for receiving data, said second interface being different from the first interface adapted to establish communication with a second external electronic entity, and
   - means for administration of the first means for security using the second interface to administer the first means for security, wherein said administration means comprises de-blocking said first interface thereby de-blocking at least the reception and/or the execution of data by said first interface.

2. The portable electronic device according to claim 1, wherein the first means for security use authentication data, the means for administration being adapted to modify said authentication data.

3. The portable electronic device according to claim 2, wherein the means for administration are adapted to re-authorize communication of data using said first interface after prohibition, by the first means for security, of said communication on detection of one of said attacks.

4. The portable electronic device according to claim 2, wherein the first interface is provided with first means for receiving data from a first external electronic entity, a first data memory area containing at least one first counter element, at least one first indicator element and at least one first threshold value, said first counter element counting at least one number of occurrences of a predetermined event that has occurred in said device on reception of data by said first means for receiving, and said first counter element being able to reach said first threshold value, said first indicator element going from a first state to a second state if said first counter element has reached said first threshold value.

5. The portable electronic device according to claim 1, wherein the means for administration are adapted to re-authorize communication of data using said first interface after prohibition, by the first means for security, of said communication on detection of one of said attacks.

6. The portable electronic device according to claim 5, wherein the first interface is provided with first means for receiving data from a first external electronic entity, a first data memory area containing at least one first counter element, at least one first indicator element and at least one first threshold value, said first counter element counting at least one number of occurrences of a predetermined event that has occurred in said device on reception of data by said first means for receiving, and said first counter element being able to reach said first threshold value, said first indicator element going from a first state to a second state if said first counter element has reached said first threshold value.

7. The portable electronic device according to claim 1, wherein the first interface is provided with first means for receiving data from a first external electronic entity, a first data memory area containing at least one first counter element, at least one first indicator element and at least one first threshold value, said first counter element counting at least one number of occurrences of a predetermined event that has occurred in said device on reception of data by said first receiving means, and said first counter element being able to reach said first threshold value, said first indicator element going from a first state to a second state if said first counter element has reached said first threshold value.

8. The portable electronic device according to claim 7, wherein the second interface is provided with second means for receiving data from a second external electronic entity, a second data memory area containing at least one second counter element, at least one second indicator element and at least one second threshold value, said second counter element counting at least one number of occurrences of said predetermined event that has occurred in said device on reception of data by said second receiving means, and said second counter element being able to reach said second threshold value, said second indicator element going from a first state to a second state if said second counter element has reached said second threshold value.

9. The portable electronic device according to claim 7, wherein the first memory area and the second memory area are different.

10. The portable electronic device according to claim 7, which includes means for blocking at least one part of the operation of said device when an indicator element is in the second state.

11. The portable electronic device according to claim 7, which includes means for blocking that block all execution on reception of data via the corresponding interface when the corresponding indicator element is in the second state except the reception of an unblocking instruction.

12. The portable electronic device according to claim 7, which includes means for switching adapted to use more secure means for security of the device when an indicator element is in the second state than when said indicator element is in the first state.

13. The portable electronic device according to claim 7, wherein said event includes a failed attempt at authentication by the electronic device.

14. The portable electronic device according to claim 7, which includes means for commanding at least one indicator element to go from the second state to the first state in an event of a successful attempt at authentication using an interface that does not correspond to said indicator element.

15. The portable electronic device according to claim 7, which includes means for initialization of the corresponding counter, said initialization means reinitializing said corresponding counter if authentication using the corresponding interface succeeds.

16. The portable electronic device according to claim 1, wherein the second interface is provided with second means for receiving data from a second external electronic entity, a second data memory area containing at least one second counter element, at least one second indicator element and at least one second threshold value, said second counter element counting at least one number of occurrences of said predetermined event that has occurred in said device on reception of data by said second receiving means, and said second counter element being able to reach said second threshold value, said second indicator element going from a first state to a second state if said second counter element has reached said second threshold value.

17. The portable electronic device according to claim 1, wherein said second interface includes means for receiving data using a protocol conforming to an ISO 7816 standard.

18. A method for securing a portable electronic device, comprising:
a step of communicating with a first external electronic entity via a first interface comprising means for emitting data and means for receiving data,
a step of detecting at least one type of attack using the first interface and of prohibition of at least one communication of data using said first interface after detection of one of said attacks,
a step of communicating with a second external electronic entity via a second interface different from the first interface, the second interface comprising means for emitting data and means for receiving data and
a step of administering an operation of the detection and prohibition step, wherein said administration step comprises de-blocking said first interface thereby de-blocking at least the reception and/or the execution of data by said first interface.

19. A portable electronic device, comprising:
a first interface adapted to establish communication with a first external electronic entity,
first means for security adapted to detect at least one type of attack and to prohibit at least one communication of data using said first interface after detection of one of said attacks,
a second interface different from the first interface adapted to establish communication with a second external electronic entity, and
means for administration of the first means for security using the second interface to administer the first means for security,
wherein said second interface is configured for receiving authentication data authorizing the administration of the first means for security,
wherein said administration means comprises de-blocking said first interface thereby de-blocking at least the reception and/or the execution of data by said first interface.

20. A portable electronic device, comprising:
a first interface adapted to establish communication with a first external electronic entity,
first means for security adapted to detect at least one type of attack and to prohibit at least one communication of data using said first interface after detection of one of said attacks,
a second interface different from the first interface adapted to establish communication with a second external electronic entity, and means for administration of the first means for security using the second interface to administer the first means for security, wherein said means for emitting and receiving data of the first interface use a contactless communication protocol and said means for emitting and receiving data of the second interface use a contact communication protocol, wherein said administration means comprises de-blocking said first interface thereby de-blocking at least the reception and/or the execution of data by said first interface.

21. A portable electronic device, comprising:

a first interface adapted to establish communication with a first external electronic entity, first means for security adapted to detect at least one type of attack and to prohibit at least one communication of data using said first interface after detection of one of said attacks, a second interface different from the first interface adapted to establish communication with a second external electronic entity, and means for administration of the first means for security using the second interface to administer the first means for security, wherein said second interface is configured for receiving authentication data authorizing the administration of the first means for security, and wherein said means for emitting and receiving data of the first interface use a contactless communication protocol and said means for emitting and receiving data of the second interface use a contact communication protocol.

22. The portable device of claim 21, wherein wherein said administration means comprises de-blocking said first interface thereby de-blocking at least the reception and/or the execution of data by said first interface.

* * * * *